(12) United States Patent
Haka et al.

(10) Patent No.: US 7,168,541 B2
(45) Date of Patent: Jan. 30, 2007

(54) MANUAL PLANETARY TRANSMISSION WITH SYNCHRONIZER CLUTCHES AND BRAKES

(75) Inventors: Raymond J. Haka, Brighton, MI (US); Paul D. Stevenson, Ann Arbor, MI (US); Douglas C. Armstrong, Novi, MI (US)

(73) Assignee: General Motors Corporation, Detroit, MI (US)

( * ) Notice: Subject to any disclaimer, the term of this patent is extended or adjusted under 35 U.S.C. 154(b) by 349 days.

(21) Appl. No.: 10/745,135

(22) Filed: Dec. 22, 2003

(65) Prior Publication Data

US 2005/0133293 A1 Jun. 23, 2005

(51) Int. Cl.
*F16D 23/06* (2006.01)
(52) U.S. Cl. ............... 192/48.8; 192/53.34; 192/53.35; 475/303
(58) Field of Classification Search ............ 192/53.34, 192/53.35; 475/303
See application file for complete search history.

(56) References Cited

U.S. PATENT DOCUMENTS

| | | | | |
|---|---|---|---|---|
| 1,944,331 | A * | 1/1934 | Thompson | 192/53.3 |
| 2,632,541 | A * | 3/1953 | Dunn | 192/48.6 |
| 5,346,442 | A * | 9/1994 | Eastman | 475/223 |
| 5,363,712 | A * | 11/1994 | Muller | 74/337.5 |
| 6,669,596 | B1 * | 12/2003 | Sefcik | 475/278 |
| 6,811,010 | B1 * | 11/2004 | Armstrong | 192/48.91 |

* cited by examiner

*Primary Examiner*—Richard M. Lorence
(74) *Attorney, Agent, or Firm*—Dan L. Thompson

(57) ABSTRACT

A manual planetary power transmission includes two planetary gearsets and three torque-transmitting synchronizer assemblies. Two of the synchronizer assemblies permit the control of one gear member of the planetary gearsets individually. The third synchronizer permits control of two of the planetary gear members individually or simultaneously. The three synchronizer assemblies are manipulable in combinations of three to provide six forward speed ratios and one reverse speed ratio in the planetary gearsets.

3 Claims, 2 Drawing Sheets ved therein a set of detent mechanisms 56 and 58, which engage
MANUAL PLANETARY TRANSMISSION WITH SYNCHRONIZER CLUTCHES AND BRAKES

TECHNICAL FIELD

This invention relates to transmissions having synchronizer clutches and, more particularly, to planetary-type gearing using synchronizer mechanisms to provide the required torque interconnections.

BACKGROUND OF THE INVENTION

Automotive manual transmissions employ synchronizer torque-transmitting mechanisms to establish the torque paths from a transmission input shaft to a transmission output shaft. Manual transmissions are generally countershaft-type transmissions wherein one of the first ratio gears is disposed on a main or central shaft and the other first ratio gear that meshes with the first ratio gear is supported on a countershaft parallel with the main shaft. The ratio gears mesh such that a plurality of gear ratios can be established between the input shaft and the output shaft with the power flow passing through the main shaft and countershaft.

A plurality of synchronizer clutches is employed on one of the shafts to permit connection and disconnection of one of the sets of ratio gears therewith. When the ratio gear is connected with the shaft, the mating gears between the central shaft and the countershaft transmit torque and speed between the shafts and to the output shaft. Each set of ratio gears has a synchronizer clutch which is a device for controlling the on-coming gear ratio to permit synchronization between the gear member and the shaft on which it is rotatably mounted. Synchronizers are well-known devices and generally employ a blocker ring, which does not allow the two portions of the synchronizers to engage until a common speed is arrived at between the two members. One of the synchronizing members is connected to an input to the gear and the other members are connected to the gear itself.

The external or outer sleeve of the synchronizer slides into the blocker ring, which engages a friction device to bring the on-coming gear up to speed and prevents completion of the shift until the speed synchronization is formed. The friction device is generally a cone clutch, which abuts a cone surface on the on-coming member. The sleeve enforces engagement of the cone clutch with the cone surface to establish speed synchronization therebetween. When the conical elements are synchronized, the sleeve passes through the blocker ring and engages a splined member that is drivingly connected with one of the ratio gears.

SUMMARY OF THE INVENTION

It is an object of the present invention to provide an improved synchronizer assembly for a power transmission incorporating planetary gearsets.

In one aspect of the invention, the synchronizer assembly includes a synchronizer torque-transmitting mechanism having a sequentially disposed input member and two output members positioned on either side thereof.

In another aspect of the present invention, the synchronizer torque-transmitting mechanism has a pair of shift collars.

In yet another aspect of the present invention, one of the shift collars is arranged on the outer periphery of the synchronizer torque-transmitting mechanism and the other shift collar is arranged on the inner periphery of the synchronizer torque-transmitting mechanism.

In still another aspect of the present invention, each of the shift collars is manipulated by separate shift mechanisms.

In a yet still another aspect of the present invention, the synchronizer torque-transmitting mechanism has two output members each having a toothed portion.

In a further aspect of the present invention, one of the toothed portions is aligned with the outer periphery of the shift collar and the other of the toothed portions is aligned with the inner periphery of the shift collar.

In a still further aspect of the present invention, the synchronizer torque-transmitting mechanism has two blocker rings each of which employs a cone clutch wherein one of the blocker rings is aligned with the outer shift collar and the other of the blocker rings has a toothed portion aligned with the inner shift collar.

DESCRIPTION OF THE DRAWING

The sole drawing FIGURE is a cross-sectional elevational view of a powertrain having a planetary manual transmission incorporating the present invention.

DESCRIPTION OF AN EXEMPLARY EMBODIMENT

Figure 1A:
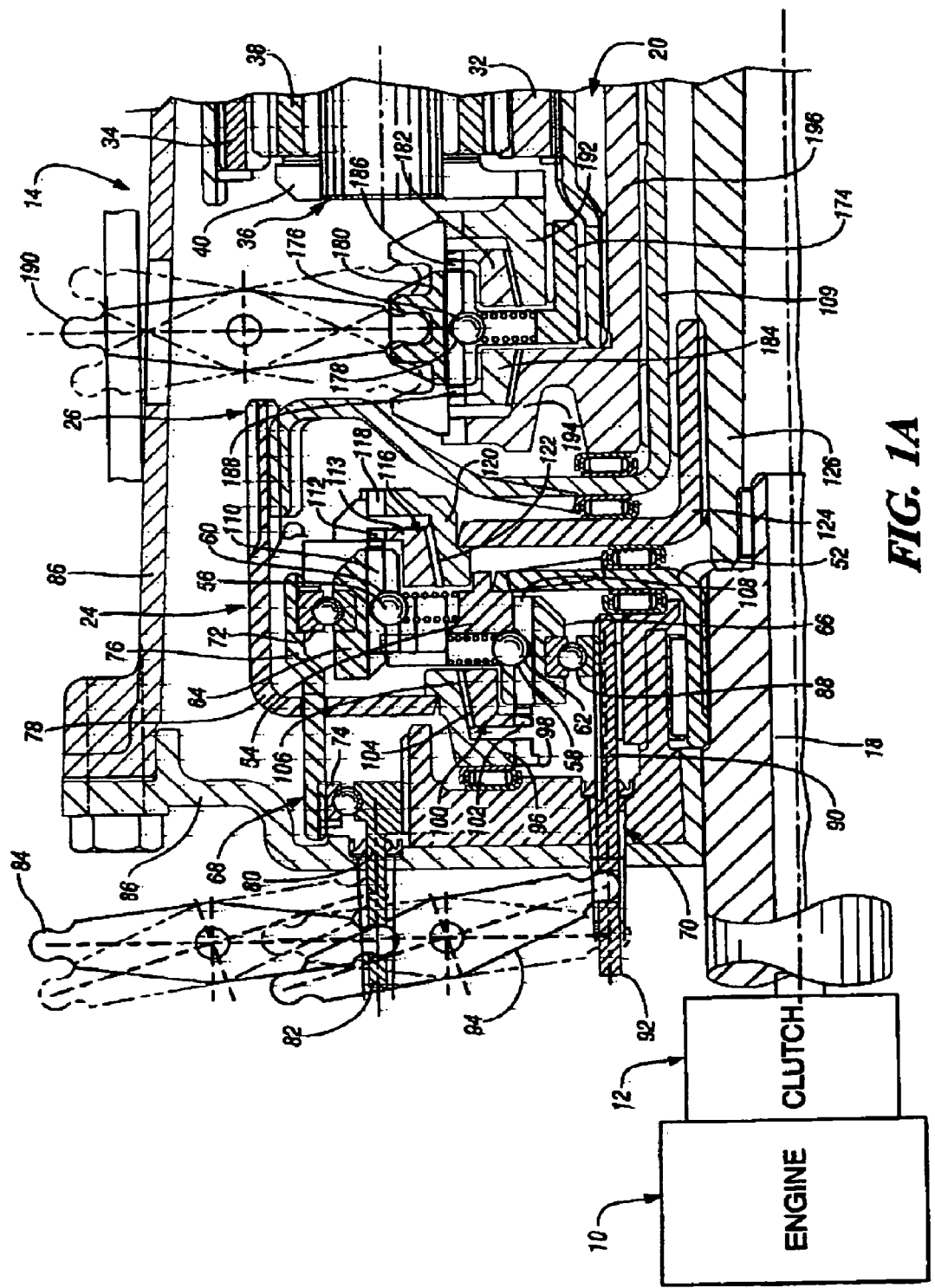
Figure 1B:
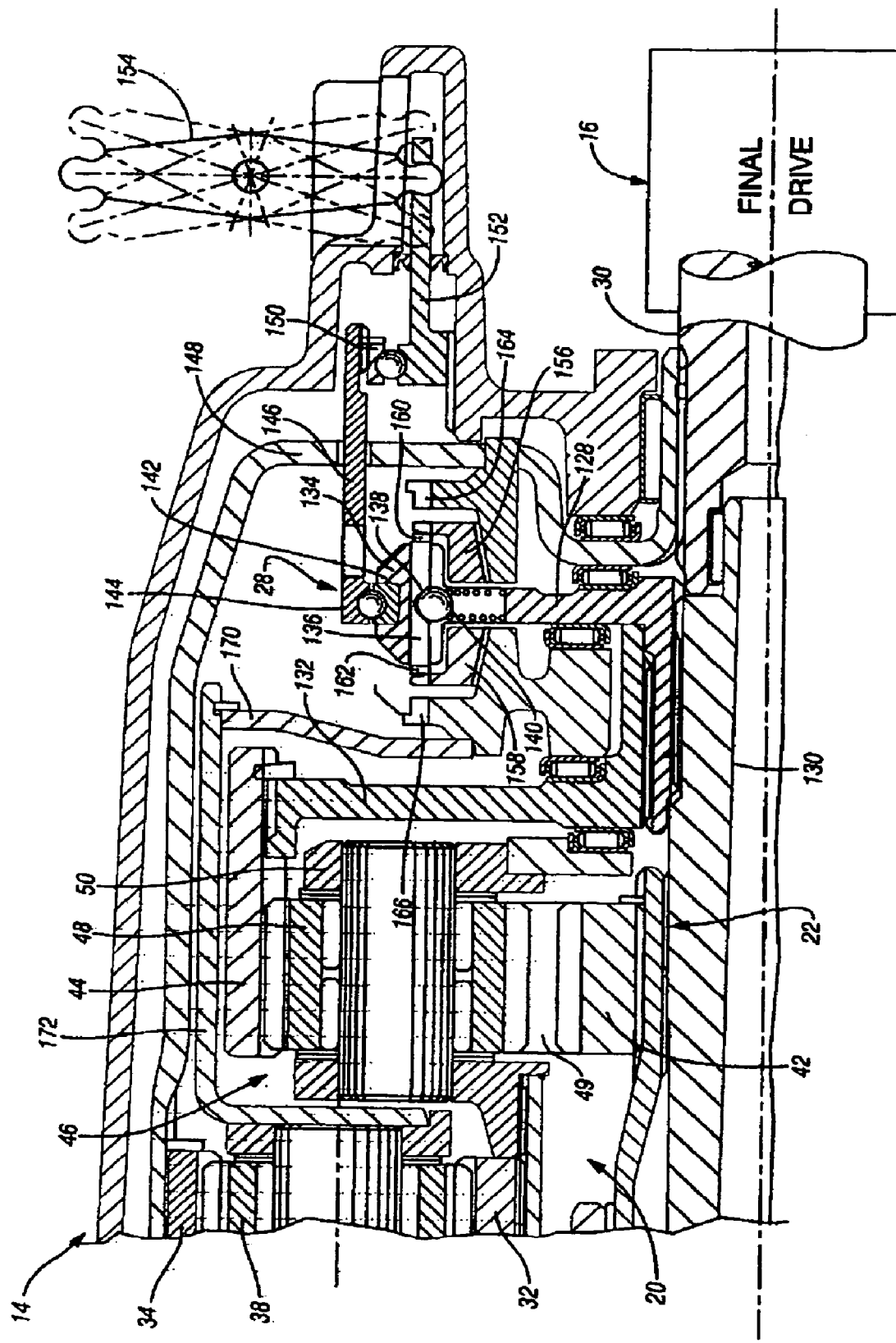

The powertrain shown in the drawing includes a conventional internal combustion engine 10, a conventional selectively engageable friction clutch 12, a power transmission 14, and a conventional final drive mechanism 16. The final drive mechanism 16 is, as is well known, connected with a pair of drive wheels for a vehicle, not shown.

The transmission 14 has an input shaft 18 that is connected with the clutch 12, which permits power to be transmitted from the engine 10 to the shaft 18. When the clutch 12 is disengaged, there is no power transmission. As is well known, the clutch 12 will generally be disengaged during shifting maneuvers. The transmission 14 includes two planetary gearsets 20 and 22, three torque-transmitting synchronizers 24, 26, and 28, and an output shaft 30. The output shaft 30 is drivingly connected with the final drive mechanism 16.

The planetary gearset 20 includes a sun gear member 32, a ring gear member 34, and a planet carrier assembly member 36. The planet carrier assembly member 36 includes a plurality of pinion gears 38 that are rotatably mounted on a planet carrier member 40 and disposed in meshing relationship with both the sun gear member 32 and the ring gear member 34.

The planetary gearset 22 includes a sun gear member 42, a ring gear member 44, and a planet carrier assembly member 46. The planet carrier assembly member 46 includes a plurality of pinion gears 48 that are disposed in mesh with a plurality of pinion gears 49. Both the pinion gears 48 and 49 are rotatably disposed on a planet carrier member 50. The pinion gear 48 meshes with the ring gear member 44 and the pinion gear 49 meshes with the sun gear member 42. The planetary gearset 20 is a simple planetary gearset often termed a single pinion planetary and the planetary gearset 22 is a compound planetary gearset often termed a double pinion planetary.

The input shaft 18 includes a hub 52 that is secured with a central portion or hub 54 of the torque-transmitting synchronizer 24. The central hub portion 54 has disposed therein a set of detent mechanisms 56 and 58, which engage respective detent grooves 60 and 62 formed in respective shift collars 64 and 66. The shift collar 64 has associated therewith a shift mechanism 68, and the shift collar 66 has associated therewith a shift mechanism 70.

The shift mechanism 68 has bearing members 72 and 74. The bearing member 72 is disposed between the shift collar 64 and a plurality of shift fingers 76. The shift fingers 76 extend through openings in a hub 78. The bearing member 74 is disposed between the shift fingers 76 and a hub 80, which has finger extensions 82 that are engaged by a shift lever 84. The fingers 82 extend through a portion of a transmission case or housing 86 and therefore the hub 80 and the finger extensions 82 are stationary while the fingers 76 are free to rotate with the hub 78 and the inner portion of the bearing 72 is free to rotate with the shift collar 64.

A bearing 88 is disposed between the shift collar 66 and a hub 90, which includes a plurality of finger members 92 which extend through the transmission case 86 and are manipulated by a shift lever 94. The portion of the bearing 88, which is engaged in the hub 90, is, of course, stationary, as controlled by the housing 86, and the outer portion of the bearing 88 is free to rotate with the shift collar 66.

As previously mentioned, the shift collar 64 is secured with the hub 52 and therefore rotatable with the input shaft 18. The hub 78 is secured to a hub 96, which includes a toothed portion 98. Disposed between the hub 96 and the shift collar 66 is a cone clutch 100 and a blocker ring 102. The cone clutch 100 has a conical friction surface 104, which is adapted to engage a conical surface 106 on the hub 96.

The shift collar 66 has a plurality of teeth 108 that are alignable with teeth on the blocker ring 102, the cone clutch 100, and the toothed portion 98. When it is desirable to engage the hub 78 with the input shaft 18, the shift collar 66 is manipulated leftward by the shift lever 94 until the shift collar 66 engages the blocker ring 102, which urges the conical surfaces 104 and 106 into engagement, thereby controlling the speed of the hub 76 into speed synchronization with the input shaft 18. When the speeds are equal, the blocker ring 102 will permit the collar 66 to continue moving leftward such that the teeth 108 engage the teeth 98, thereby completing the shift and providing a torque path from the input shaft 18 to the hub 78. The hub 78 is connected with a housing 109, which in turn is connected with the sun gear member 42. Thus, when the shift collar 66 engages the hub 96, the sun gear member 42 will rotate in unison with the input shaft 18.

The shift collar 64 has a plurality of teeth 110 that are alignable with a plurality of teeth 112 on a blocker ring 113 and a plurality of teeth 118 disposed on a hub 120. When the shift collar 64 is moved rightward by the shift lever 84, the shift collar 64 will engage the blocker ring teeth 112 thereby urging the cone clutch 116 into engagement wit a conical portion 122 formed on the hub 120. This will cause the speed of the hub 120 to increase until it is equal to the speed of the input shaft 18 at which time the shift collar 64 is permitted to pass through the blocker ring 113 and into mesh with the teeth 118.

The hub 120 is connected with a hub 124, which is drivingly connected with a shaft 126. The shaft 126 is connected with a central hub 128 of the torque-transmitting synchronizer 28. The hub 128 has a sleeve portion 130, which is drivingly connected with a housing 132 that is drivingly connected with the ring gear member 44 of the planetary gearset 22. Thus, the shaft 126, hub 128, and ring gear member 44 rotate in unison.

The hub 128 supports a shift collar 134, which includes a plurality of teeth 136 and a detent opening 138, which is adapted to cooperate with a detent mechanism 140 to centrally position the shift collar 134 on the hub 128. The collar 134 has a groove 142 in which a support bearing or control bearing 144 is disposed. The outer portion of the bearing 144 is secured to a plurality of finger members 146 that extend through a hub 148 and engage a bearing member 150. The bearing member 150 has a portion thereof connected with a plurality of fingers 152 that are engaged by a shift lever 154. The shift lever 154 is operable to move the shift collar 134 left and right from the central position shown in the drawing FIGURE.

The torque-transmitting synchronizer 28 includes two cone clutches 156 and 158, two blocker rings 160, 162, and two output hubs 164 and 166. The shift collar 134 when moved rightward engages teeth on the blocker ring 160 to cause the cone clutch 156 to engage the hub 164 thereby causing synchronization speed between the hub 128 and the hub 164. The hub 164 is connected with the transmission output shaft 30 and also with the ring gear member 34 of the planetary gearset 20. Therefore, when the torque-transmitting synchronizer 28 is engaged in the rightward position, the shaft 126 and ring gear member 44 are connected with the output shaft 30.

When the shift collar 134 is moved leftward by the shift lever 154, the shift collar 134 engages a blocker ring 162 which causes the cone clutch 158 to engage the hub 166 thereby creating synchronous speed between the hub 128 and the hub 166. When the synchronous speed has been reached, the shift collar 134 is moved into engagement with a plurality of teeth on the hub 166. The hub 166 is connected with an annular disk 170, which is connected to a housing 172, which in turn is secured to the planet carrier member 40 of the planetary gearset 20. Thus, when the shift collar 134 is moved leftward, the shaft 126 is drivingly connected with the planet carrier member 40 of the planet carrier assembly member 36.

The torque-transmitting synchronizer 26 includes a central hub 174, which is secured with the transmission housing 86. The central hub 174 also has disposed therein a detent mechanism 176, which engages a detent slot 178 formed in a shift collar 180. The torque-transmitting synchronizer 26 also includes a pair of cone clutches 182 and 184 and a pair of blocker rings 186 and 188. The shift collar 180 is manipulated by a shift lever 190.

When the shift lever 190 moves the shift collar 180 rightward, the blocker ring 186 urges the cone clutch 182 into engagement with a hub 192, which will cause the hub 192 to become synchronous at the zero speed with the central hub 174 before the shift is completed. The hub 192 is secured to the planet carrier member 40 of the planetary gearset 20. Thus, when the synchronizer 26 engages the hub 192, the planet carrier member 40, the hub 192, disk 170, and hub 166 are held stationary.

When the shift lever 190 moves the shift collar 180 leftward, the blocker ring 188 causes the cone clutch 184 to engage a hub 194. When the hub 194 and the hub 174 are synchronized, the shift of the collar 180 is completed. The hub 194 has a sleeve portion 196, which engages both the sun gear member 32 of the planetary gearset 20 and the planet carrier member 50 of the planetary gearset 22. When the shift collar 180 engages the hub 194, both the sun gear member 32 and the planet carrier member 50 are held stationary.

The torque-transmitting synchronizers 26 and 28 are essentially standard or conventional synchronizers in that the shift collars 180 and 134, respectively, are on the outer periphery of the synchronizer mechanism and are movable rightward to control one speed combination and leftward to control another speed combination.

The torque-transmitting synchronizer assembly 24, however, is substantially different. The torque-transmitting synchronizer 24 has the outer shift collar 64, which creates a drive connection between the input shaft 18 and the shaft 126 and a central position where no drive condition is occurring. The torque-transmitting synchronizer 24 also has the inner shift collar 66, which is manipulable to provide an engagement between the input shaft 18 and the hub 96. The shift collar 66 also a neutral condition as shown. Thus, all of these torque-transmitting synchronizers 24, 26, and 28 can be placed in neutral. However, the torque-transmitting synchronizer assembly 24 can be manipulated such that the outer shift collar 64 engages the hub 120 and simultaneously the inner shift collar 66 engages the hub 96. Thus, both the shaft 126 and the hub 124 can be driven by the input shaft 18 simultaneously.

It should be noted that with this engagement, the sun gear member 42 and ring gear member 44 of the planetary gearset 20 are rotating in unison with the input shaft 18 and therefore the planetary gearset 22 is in a condition known as a 1:1 or lock-up condition. When this occurs, it should be noted that also the sun gear member 32 will rotate in unison with the input shaft 18 since the sun gear member 32 is drivingly connected with the planet carrier member 50.

One further input shaft drive connection should be noted. That is, the central hub 128 of the torque-transmitting synchronizer 28 will also rotate in unison with the input shaft 18. Thus, if both shift collars 66 and 64 are engaged in their driving conditions, and the synchronizer of shift collar 134 is engaged with the hub 164, the input shaft 18 and the output shaft 30 will rotate in unison. This would be a direct drive to the transmission 14.

The torque-transmitting synchronizers 24, 26, and 28 can be manipulated to establish six forward speed ratios and one reverse speed ratio between the input shaft 18 and the output shaft 30.

To establish the reverse speed ratio, the torque-transmitting synchronizer 24 is engaged in the rightward position, the synchronizer 24 is also engaged in the leftward position, and synchronizer 26 is engaged in the rightward position. Under this condition, the sun gear member 32 is driven at input speed, the planet carrier member 40 is held stationary, and the ring gear member 34 and therefore output shaft 30 rotate opposite in direction to the input shaft 18.

To establish the first forward speed ratio, the torque-transmitting synchronizer 28 is in the rightward position, the torque-transmitting synchronizer 24 is in the rightward position, and the torque-transmitting synchronizer 26 is also in the rightward position. Under this condition, the sun gear member 42 is driven forwardly by the input shaft 18, the ring gear member 44 reacts at the output shaft 30 by causing the planet carrier member 50 to rotate in reverse along with the sun gear member 32. The reverse rotation of the sun gear member 32 causes forward rotation of the ring gear member 34 and therefore the output shaft 30. The first gear ratio is a reduction drive.

The second forward speed ratio is established with the engagement of the torque-transmitting synchronizer 28 in the leftward position, torque-transmitting synchronizer 24 in the rightward position, and the torque-transmitting synchronizer 26 in the rightward position. In this condition, the sun gear member 42 is driven forwardly with the input shaft 18, the ring gear member 44 and planet carrier member 40 are held stationary such that the planet carrier member 50 is driven opposite to the input shaft 18 as is the sun gear member 32 resulting in forward rotation of the ring gear member 34 and therefore output shaft 30. Note that the difference between the first and second forward speed ratios is the fact that the ring gear member 44 is a stationary reaction member rather than a rotating member.

To establish the third forward speed ratio, the torque-transmitting synchronizer 28 is the in rightward position, the torque-transmitting synchronizer 24 remains in the leftward position, and the torque-transmitting synchronizer 26 is in the rightward position. Under this condition, the sun gear member 42 is rotated in unison with the input shaft 18 and the ring gear member 44 is rotated forward at a reduced ratio and through the torque-transmitting synchronizer 28 the output shaft 30 is also rotated at a reduced speed.

To establish the fourth forward speed ratio, the torque-transmitting synchronizer 28 is manipulated to a leftward position, torque-transmitting synchronizer 24 remains in the leftward position, and the torque-transmitting synchronizer 26 is in the leftward position. During the fourth forward speed ratio, the sun gear member 42 is rotated forwardly, the planet carrier member 50 and sun gear member 32 are stationary such that the ring gear member 44 and the planet carrier member 40, which is connected therewith through the torque-transmitting synchronizer 28 rotate forwardly at a reduced ratio, and the ring gear member 34 is driven forwardly as is the output shaft 30. Note that the planetary gearset 22 provides a forward underdrive ratio while the planetary gearset 20 provides a forward overdrive ratio. Thus, the fourth gear has a higher speed ratio than the third gear.

The fifth forward speed ratio is established with the torque-transmitting synchronizer 28 in the leftward position, the torque-transmitting synchronizer 24 in both the leftward and rightward positions. Under this condition, a 1:1 drive is provided through the planetary gearsets 20 and 22.

The sixth forward speed ratio is established with the torque-transmitting synchronizer 28 in the leftward position, the torque-transmitting synchronizer 24 in the rightward position, and the torque-transmitting synchronizer 26 in the leftward position. During the sixth forward speed ratio, the planet carrier member 40 is driven forwardly at the speed of the input shaft 18, the sun gear member 32 is held stationary by the torque-transmitting synchronizer 26, and the ring gear member 34 and therefore output shaft 30 are rotated forwardly at an overdrive ratio. The torque-transmitting synchronizer 28 and the torque-transmitting synchronizer 24 cooperate to provide the input drive from the input shaft 18 to the planet carrier member 40.

The selectively engageable clutch 12 is, of course, released during each of the ratio interchanges since they are not full power upshifts or downshifts. The unique structure of the torque-transmitting synchronizer 24 permits the control of the planetary gearset 22 to establish a 1:1 drive ratio through the planetary gearset.

The invention claimed is:

1. A synchronizer assembly comprising:
   a rotatable hub member surrounding a portion of said synchronizer;
   an input member;
   an output member shiftable to selectively couple said input member to a rotatable output means; and
   shift assembly means for shifting said output member to provide engagement between said output member and said rotatable output means, said shift assembly means comprising shift means disposed for linear movement on a stationary housing and being in operable connection with said output member through rotary connecting means extending through said rotatable hub member.

2. A synchronizer assembly comprising:
a central input member;
an outer output member shiftable to selectively couple said central input member to a first output means;
an inner output member shiftable to selectively couple said central input member to a second output means; and
shift means for independently shifting said inner and said outer output members to provide three combinations of engagement for said synchronizer assembly comprising a first shift means disposed for linear movement on a stationary housing, a second shift means disposed for rotary movement and being in contact with said outer output member and a rotary connecting means for connecting said first shift means and said second shift means.

3. The synchronizer assembly defined in claim 2 further wherein:
said shift means is operable to simultaneously connect said central input member with both said first and second output means.

* * * * *